(12) United States Patent
Braunschweig

(10) Patent No.: US 9,828,033 B2
(45) Date of Patent: Nov. 28, 2017

(54) METHOD FOR PRODUCING A VEHICLE COMPONENT, AND VEHICLE COMPONENT

(75) Inventor: Wolfgang Braunschweig, Höhr-Grenzhausen (DE)

(73) Assignee: ALERIS ROLLED PRODUCTS GERMANY GMBH, Koblenz (DE)

( * ) Notice: Subject to any disclaimer, the term of this patent is extended or adjusted under 35 U.S.C. 154(b) by 420 days.

(21) Appl. No.: 14/127,440

(22) PCT Filed: Jun. 8, 2012

(86) PCT No.: PCT/EP2012/060886
§ 371 (c)(1),
(2), (4) Date: Dec. 18, 2013

(87) PCT Pub. No.: WO2012/175347
PCT Pub. Date: Dec. 27, 2012

(65) Prior Publication Data
US 2014/0125090 A1 May 8, 2014

(30) Foreign Application Priority Data
Jun. 24, 2011 (DE) .......................... 10 2011 078 032

(51) Int. Cl.
*B62D 25/04* (2006.01)
*C22C 21/10* (2006.01)
(Continued)

(52) U.S. Cl.
CPC .............. *B62D 25/04* (2013.01); *B23K 26/32* (2013.01); *B23K 31/02* (2013.01); *B23K 35/288* (2013.01);
(Continued)

(58) Field of Classification Search
CPC ........ B62D 25/04; B23K 26/32; B23K 31/02; B23K 35/288; B23K 2203/08
(Continued)

(56) References Cited

U.S. PATENT DOCUMENTS 6,972,110 B2 * 12/2005 Chakrabarti ....... B22D 17/2209
148/417

8,524,014 B2 * 9/2013 Chakrabarti ....... B22D 17/2209
148/417

(Continued)

FOREIGN PATENT DOCUMENTS

| CN | 1489637 A | 4/2004 |
|---|---|---|
| WO | 02052053 A1 | 7/2002 |
| WO | 2010142579 A1 | 12/2010 |

OTHER PUBLICATIONS

International Search Report dated Oct. 2, 2012 for International Patent Application No. PCT/EP2012/060886 having an International filing of Jun. 8, 2012.
International Preliminary Report on Patentability dated Dec. 24, 2013 for PCT International Application No. PCT/EP2012/060886, International Filing Date Jun. 8, 2012.
Pillar, Wikipedia, URL: <https://en.wikipedia.org/wiki/Pillar_(car)>, retrieved from the Internet Jul. 5, 2017.

*Primary Examiner* — Sarang Afzali
(74) *Attorney, Agent, or Firm* — Vorys, Sater, Seymour and Pease LLP

(57) ABSTRACT

Method for producing a vehicle component, in particular a motor vehicle component, in particular a B-pillar, including providing a first aluminum alloy and a second aluminum alloy. The second alloy composition substantially matches the first aluminum alloy composition. Performing a heat-treatment of the first alloy to increase the ductility of the first alloy. Performing a heat-treatment of the second alloy. The heat-treatment of the first alloy differing from the heat-treatment of the second alloy. Welding together the heat-treated first alloy and the heat-treated second alloy to obtain a composite part. Shaping the composite parts into a motor vehicle component. The motor vehicle component sub-region of the first alloy can be designed as a predetermined deformation region when a force is applied due to an accident to achieve a good combination of rigid regions for example forming a safety cell, and deformable regions forming a crumple zone for absorbing energy.

18 Claims, 2 Drawing Sheets

Figure 1:
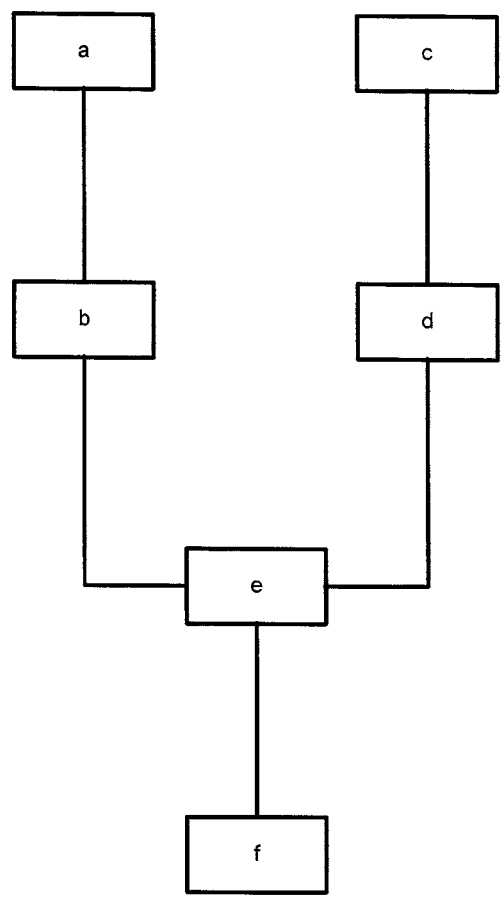

(51) Int. Cl.
*C22F 1/053* (2006.01)
*B23K 35/28* (2006.01)
*B23K 31/02* (2006.01)
*B23K 26/32* (2014.01)
*B23K 103/10* (2006.01)
*B23K 103/18* (2006.01)

(52) U.S. Cl.
CPC .............. *C22C 21/10* (2013.01); *C22F 1/053* (2013.01); *B23K 2203/10* (2013.01); *B23K 2203/18* (2013.01); *Y10T 29/49622* (2015.01)

(58) Field of Classification Search
CPC ..... B23K 2203/10; C22F 1/053; C22C 21/10; Y10T 29/49622; Y10T 29/49616
See application file for complete search history.

(56) References Cited

U.S. PATENT DOCUMENTS

| | | | |
|---|---|---|---|
| 8,613,820 B2* | 12/2013 | Smeyers | C22C 21/10 148/417 |
| 2002/0121319 A1 | 9/2002 | Chakrabarti et al. | |
| 2005/0150579 A1 | 7/2005 | Chakrabarti et al. | |
| 2007/0151636 A1 | 7/2007 | Buerger et al. | |
| 2008/0283163 A1* | 11/2008 | Bray | B64C 3/182 148/690 |
| 2010/0037998 A1 | 2/2010 | Bray et al. | |
| 2011/0042222 A1* | 2/2011 | Peters | C09D 5/4438 205/50 |
| 2012/0090742 A1 | 4/2012 | Smeyers et al. | |

\* cited by examiner

METHOD FOR PRODUCING A VEHICLE COMPONENT, AND VEHICLE COMPONENT

CROSS-REFERENCE TO RELATED APPLICATIONS

This is a §371 National Stage Application of International Application No. PCT/EP2012/060886 filed on 8 Jun. 2012, claiming the priority of German Patent Application No. 102011078032.7 filed on 24 Jun. 2011.

The invention relates to a vehicle component, in particular a motor vehicle component of two aluminum alloys welded together, in particular a B-pillar, as well as a method for producing the same.

PRIOR ART

Supporting vehicle pillars of motor vehicles connect the roof area (rooftop and inner body side panels) of a motor vehicle to the lower body structure. In case of an accident involving overturning the pillars function as a life-saving stabilization of the passenger compartment against vertical deformation. They furthermore have the function of absorbing forces in side impact so that the vehicle occupants will remain safe and sound.

The supporting vehicle pillars will be identified by letters continuing from the front to the rear. The B-pillar for example represents the linking element between the vehicle bottom and the vehicle rooftop in the middle of the passenger compartment. Nowadays, in vehicle body construction press hardened quenched and tempered boron steels (e.g. 22MnB5) are traditionally used in the B-pillar. Thereby, the upper part of the pillar is designed for strength to avoid penetration of the B-pillar in the inner space whereas the lower part shows substantially reduced strengths but, in turn, where higher requirements are imposed to ductility. This will be accomplished by partially quenching and tempering in the lower part of the pillar. The material properties which can be found, by way of deformational work in the lower part, allow reducing energy which will be absorbed by the B-pillar during the side impact, thus enabling to withstand energy in the upper part of the pillar.

In modern light construction efforts motor vehicle bodies and cladding components will increasingly be manufactured from light metals, especially aluminum-based alloys. To assure the required structural stability of the motor vehicles utilization of high-strength or higher-strength alloys, in particular aluminum alloys of the AA 7xxx alloy class are preferred. Such alloys have especially good strength, conferring the required statical and dynamic strength to a motor vehicle made from such metals. Disadvantageously such alloys show little ductility and thus are poorly deformable. Consequently the manufacture of such motor vehicle components becomes elaborate, since for example in deep-drawing, due to the low ductility, a high number of drawing steps is required. Also crumple performance of a motor vehicle having such components often is not optimal due to poor ductility and deformability since in case of force applied due to an accident very little energy will be absorbed because of low deformation of the components.

Therefore, the object of the present invention is to provide a vehicle component, in particular a B-pillar, enabling production of motor vehicles from high-strength or higher strength aluminum alloys, respectively, simultaneously exhibiting good crumple properties. Furthermore the object of the present invention is to provide a method for producing such a vehicle component.

DESCRIPTION OF THE INVENTION

This object will be solved by a method comprising the following steps:
a) providing a first aluminum alloy;
b) performing heat-treatment of the first aluminum alloy in order to increase the ductility of the first aluminum alloy;
c) providing a second aluminum alloy, the composition of which substantially corresponds to that of the first aluminum alloy;
d) performing heat-treatment of the second aluminum alloy, the heat-treatment of the first aluminum alloy differing from the heat-treatment of the second aluminum alloy;
e) welding together the heat-treated first aluminum alloy and the heat-treated second aluminum alloy, in order to obtain a composite part; and
f) shaping the composite part into a motor vehicle component.

According to the invention, by aluminum alloy an alloy is understood, the main component of which is aluminum. By the second aluminum alloy, the composition of which substantially corresponds to that of the first aluminum alloy, in particular an aluminum alloy is understood, the chemical composition of which differs by maximally 0.5% by weight in regard to each of its components from the composition of the first aluminum alloy.

In the method for producing a motor vehicle component according to the invention at least that sub-region of the motor vehicle component which consists of the first aluminum alloy will be subjected to heat-treatment (tempering) in order to increase ductility. In this way in the production of the component the desired deformability may be assured and crumple properties of the component may be improved as well. By increasing the ductility a higher degree of deformation will be attained in case of crumpling, so that the structural component will be able to absorb more energy.

According to the invention different heat-treatments are applied to the first aluminum alloy and to the second aluminum alloy, the heat-treatments preferably resulting in T6 or T7 degrees of hardness, respectively. In this way the mechanical properties of the component may locally be optimized, so that for example a B-pillar may have a particularly ductile predetermined deformation region and a particularly rigid safety region. The position of the individual regions may thereby be adjusted depending on each of the desired crumple properties of the component, so that in total with such structural components a motor vehicle may be created which has low total weight as well as a particularly rigid and thus stable safety cell in combination with particularly good deformable and thus energy-absorbing crumple zones. It is therefore preferred that the heat-treatment of the second aluminum alloy is not for increase of ductility but for increase of strength.

The two heat-treatments will be performed before shaping the motor vehicle components. In this way shaping will be facilitated, for example in deep-drawing a high number of deep-drawing steps may be omitted.

Welding together the two aluminum alloys is preferably done by friction stir welding (FSW) or laser beam welding.

Shaping the composite parts into a motor vehicle component is done by using known methods which are also used for conventional motor vehicle components. If the motor vehicle component according to the invention is a B-pillar, this may for example be produced starting from a composite part in the form of a flatly cut ingot. This ingot is cut such that it will be present in the form of a rectangle and a trapezoid which will be arranged against each other. In this way a trumpet-formed tube section is obtained from which the B-pillar is for example produced by hydroforming, i.e. the wall of the tube section is pressed against a shaped part or a die under the influence of water pressure.

It is suitable that, according to the invention, for each of the first aluminum alloy and second aluminum alloy a high-strength or higher-strength alloy is used, in particular an AA 7xxx class aluminum alloy (herein the designation of aluminum alloys is done by way of a registration number of the Aluminum Association (AA) under "International Alloy Designations and Chemical Composition Limits for Wrought Aluminum and Wrought Aluminum Alloys"). In the non-heat-treated state such alloys have particularly high rigidity, so that a motor vehicle made of such structural components has the required static and dynamic rigidity, the heat-treatment simultaneously assuring good processability of the material and good crumple performance. In elongation of approx. 8 to 10% strengths of $Rp_{0.2}>500$ MPa may be obtained with these alloys.

In a preferred embodiment the two AA 7xxx class aluminum alloys especially preferable are aluminum alloys, which are selected from the group consisting of the AA 7055, AA7081, AA 7181, AA 7085, AA 7185 class alloys.

In a preferred embodiment the two aluminum alloys of the AA 7xxx class are aluminum alloys, which, in % by weight, independent of each other have the following chemical composition:

Zn: 6.9-8.4, in particular 6.9-7.8
Mg: 1.2-2.4, in particular 1.4-2.1
Cu: 1.3-2.6
Mn: <0.3
Cr or Zr: 0.05-0.25
Si: <0.3, in particular 0.1-0.25
Fe: <0.35, in particular 0.1-0.25
Ti: <0.1
other elements: <0.05 each, <0.2 in total
balance: aluminum.

Especially preferably the aluminum alloy contains 0.04-0.25% by weight, in particular 0.07-0.18% by weight, of zirconium. Furthermore it is especially preferred, that each one of the aluminum alloys contains 1.4-1.8% by weight of copper. These aluminum alloys show strengths of $Rp_{0.2}>500$ MPa, in particular more than 530 MPa. Preferred thicknesses of the metal sheet of each aluminum alloy are in the range of between 0.5 and 3.5 mm.

It is known that class 7xxx aluminum alloys may contain up to 0.05% by weight of Ca, up to 0.05% by weight of Sr and up to 0.004% by weight of Be. Traditionally beryllium is used as an antioxidant and may also be added to the aluminum alloys according to the invention. However, beryllium is highly toxic. Due to environmental protection and health protection reasons it therefore is preferred that the aluminum alloys used according to the invention are substantially free of beryllium. Low amounts of calcium or strontium may be added to the aluminum alloys, alone or in a mixture to fulfill the same function as beryllium. Preferably each of the two aluminum alloys contains 10 to 100 ppm of calcium.

The invention furthermore relates to a motor vehicle component, in particular a B-pillar, which may be produced by the method according to the invention. As it has already been stated, local optimization of the material properties may be attained by way of the two different heat-treatments of the structural components. Herein, it is especially suitable that the sub-region of the motor vehicle component which consists of the first aluminum alloy is designed as a predetermined deformation region in force application due to an accident in order to thus create a particularly good combination of rigid regions which form for example a safety cell, and deformable regions which form a crumple zone for absorbing energy.

By utilization of the aluminum alloys according to the invention the motor vehicle component according to the invention offers a weight potential of about 40% compared to an approach which uses steel. If the motor vehicle component is a B-pillar this corresponds to a saving in weight of 10 to 13 kg per vehicle.

In order to satisfy the different requirements of the motor vehicle component the invention makes use of different tempers (states of aging) for the two aluminum alloys. The material properties of the initial board will herein be optimized such that the required properties will be present in the structural component following shaping, in particular W-temper shaping, and subsequent cathodic dip coating (KTL) and/or coating cycle.

SHORT DESCRIPTION OF THE DRAWINGS

In the following, the invention and its embodiments will be explained in detail by way of figures, without limitation thereof.

FIG. 1 shows a schematic representation of the method according to the invention.

Figure 2:
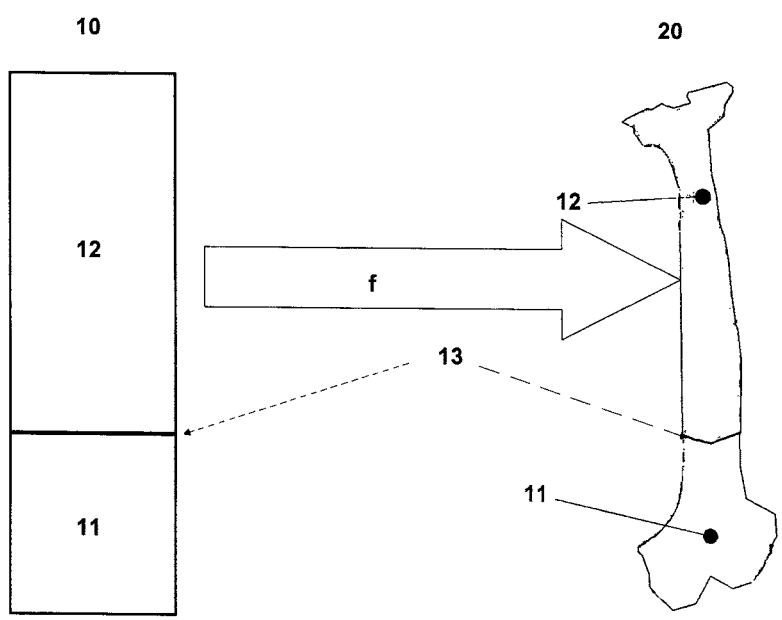

FIG. 2 schematically represents the shaping of a composite part according to the invention into a B-pillar.

DESCRIPTION OF A PREFERRED EMBODIMENT

FIG. 1 schematically represents the operation of the method according to the invention. In an embodiment in step a) a board made of a class AA 7081 alloy as a first aluminum alloy is provided. To increase the ductility of the first aluminum alloy in step b) a T6 or T7 heat-treatment, preferably from the group of the T73, T74, T76, T77, T78 or T79 heat-treatments, especially preferably a T73 heat-treatment of the first aluminum alloy is performed. As a second aluminum alloy in step c) a board made of an alloy is provided, which also belongs to the AA 7081 class. To increase the strength of the second aluminum alloy in step d) another T6 or T7 heat-treatment, preferably from the group of the T73, T74, T76, T77, T78 or T79 heat-treatments, of the second aluminum alloy is performed, however, the latter differs from the heat-treatment of the first aluminum alloy, and preferably is e.g. a T76 heat-treatment, if the heat-treatment of the first aluminum alloy was a T73 heat-treatment or vice versa. Subsequently in step e) the heat-treated first aluminum alloy and the heat-treated second aluminum alloy are welded together by way of friction stir welding (FSW) to obtain a composite part. In step f) the composite part will be shaped into a trumpet-shaped tube section from which by way of hydroforming a B-pillar will be produced.

FIG. 2 represents in detail the shaping according to the invention of the composite parts into a B-pillar. The composite part 10 in the form of a board consists of the first aluminum alloy 11 and the second aluminum alloy 12. The two aluminum alloys have already been heat-treated in the method steps b) and d) and joint together in the method step e) by way of a weld joint 13. Shaping f) into a motor vehicle component 20 in the form of a B-pillar is done by hydroforming. Due to increase of ductility of the sub-region from the first aluminum alloy 11, the sub-region will obtain particularly good deformation properties in the case of force application due to an accident. The region from the first aluminum alloy 11 thus is designed as a predetermined deformation region, which may be deformed in crumpling, thus absorbing a high amount of energy. Whereas the sub-region from the second aluminum alloy 12 has high rigidness. Hence, when force is applied due to an accident there is no substantial deformation in this sub-region of the B-pillar. This rigid sub-region thus contributes to the safety of the passenger compartment.

It is understood that, besides the B-pillar which is shown, the method as set forth herein may also find applicability for other motor vehicle components. In particular engine cover interior parts, motor vehicle tunnels, all frontal longitudinal members, side skirts, side protection structural parts, bumper bending elements, seat cross members, roof frames, roof cross rails, back panel cross elements, instrument panel cross elements, and the back panel itself.

In total, by the use of such parts a motor vehicle may be created which due to the use of aluminum is especially lightweight, but simultaneously also shows locally optimized combination of ductility-and thus of energy absorption in the case of crumpling—and rigidness.

LIST OF REFERENCE NUMBERS

10: composite part
11: first aluminum alloy
12: second aluminum alloy
13: welding joint
20: vehicle component

The invention claimed is:

1. A method for producing a motor vehicle component, wherein the motor vehicle component is a B-pillar, comprising the following steps:
   a) providing a first aluminum alloy;
   b) performing a heat-treatment of the first aluminum alloy to increase the ductility of the first aluminum alloy;
   c) providing a second aluminum alloy;
   d) performing a heat-treatment of the second aluminum alloy, the heat-treatment of the first aluminum alloy differing from the heat-treatment of the second aluminum alloy;
   e) welding together the heat-treated first aluminum alloy and the heat-treated second aluminum alloy, to obtain a composite part;
   f) shaping the composite part into the motor vehicle component, wherein the B-pillar has deformable regions in combination with rigid regions; and
   g) cathodic dip coating and/or coating cycle of the B-pillar;
   wherein the first aluminum alloy and second aluminum alloy are each a metal sheet having a thickness range between 0.5 to 3.5 mm;
   wherein the region of the B-pillar made of the first aluminum alloy is designed as a predetermined deformation region for deforming when force is applied due to an accident; and
   wherein the region of the B-pillar made of the second aluminum alloy is designed to have higher rigidness than the region of the B-pillar made of the first aluminum alloy.

2. The method according to claim 1, wherein each of the first aluminum alloy and the second aluminum alloy independently of each other, in % by weight, have the following chemical composition:
   Zn: 6.9-8.4
   Mg: 1.2-2.4
   Cu: 1.3-2.6
   Mn: <0.3
   Cr or Zr: 0.05-0.25
   Si: <0.3
   Fe: <0.35
   Ti: <0.1
   other elements: <0.05 each, <0.2 in total
   balance: aluminum.

3. The method according to claim 2, wherein the heat treatment of the first aluminum alloy results in a T6 degree of hardness and the heat treatment of the second aluminum alloy results in a T6 degree of hardness.

4. The method according to claim 3, wherein the heat treatment of the second aluminum alloy is not for increase in ductility but for increase of strength.

5. The method according to claim 2, wherein each of the first aluminum alloy and the second aluminum alloy contains 0.05-0.25% by weight, of zirconium.

6. The method according to claim 2, wherein each of the first aluminum alloy and the second aluminum alloy contains 0.07-0.18% by weight, of zirconium.

7. The method according to claim 2, wherein each of the first aluminum alloy and the second aluminum alloy contains 1.4-1.8% by weight, of copper.

8. The method according to claim 1, wherein the composition of the second aluminum alloy differs by maximally 0.5% by weight in regard to each of its elemental components from composition of the first aluminum alloy.

9. The method according to claim 8, wherein each of the first aluminum alloy and the second aluminum alloy independently of each other, in % by weight, have the following chemical composition:
   Zn: 6.9-7.8
   Mg: 1.4-2.1
   Cu: 1.3-2.6
   Mn: <0.3
   Cr or Zr: 0.05-0.25
   Si: 0.1-0.25
   Fe: 0.1-0.25
   Ti: <0.1
   other elements: <0.05 each, <0.2 in total
   balance: aluminum.

10. The method according to claim 9, wherein the heat treatment of the first aluminum alloy results in a T73 heat treatment and the heat treatment of the second aluminum alloy is a T74, T76, T77, T78 or T79 heat treatment.

11. The method according to claim 9, wherein the heat treatment of the first aluminum alloy results in a T73 heat treatment and the heat treatment of the second aluminum alloy is a T76 heat treatment.

12. The method according to claim 8, wherein each of the first aluminum alloy and the second aluminum alloy independently of each other, in % by weight, have the following chemical composition:
   Zn: 6.9-8.4
   Mg: 1.2-2.4
   Cu: 1.3-2.6
   Mn: <0.3
   Cr or Zr: 0.05-0.25
   Si: <0.3

Fe: <0.35
Ti: <0.1
other elements: <0.05 each, <0.2 in total
balance: aluminum.

13. The method according to claim 1, wherein each of the first aluminum alloy and the second aluminum alloy is an AA 7xxx class aluminum alloy.

14. The method according to claim 13, wherein each of the first aluminum alloy and the second aluminum alloy is an aluminum alloy selected from the group consisting of AA 7055, AA7081, AA 7181, AA 7085, and AA 7185class alloys.

15. The method according to claim 1, wherein each of the first aluminum alloy and the second aluminum alloy independently of each other, in % by weight, have the following chemical composition:
Zn: 6.9- 7.8
Mg: 1.4-2.1
Cu: 1.3-2.6
Mn: <0.3
Cr or Zr: 0.05-0.25
Si: 0.1-0.25
Fe: 0.1-0.25
Ti: <0.1
other elements: <0.05 each, <0.2 in total
balance: aluminum.

16. The method according to claim 15, wherein each of the first aluminum alloy and the second aluminum alloy contains 0.07-0.18% by weight, of zirconium.

17. The method according to claim 1, wherein welding together the two aluminum alloys is done by way of friction stir welding or laser beam welding.

18. The method according to claim 1, wherein the shaping is W-temper shaping.

* * * * *